Feb. 11, 1964 A. ROBERTS ETAL 3,121,223
RADAR AND TELEVISION AID TO NAVIGATION
Filed Oct. 7, 1960 4 Sheets-Sheet 1
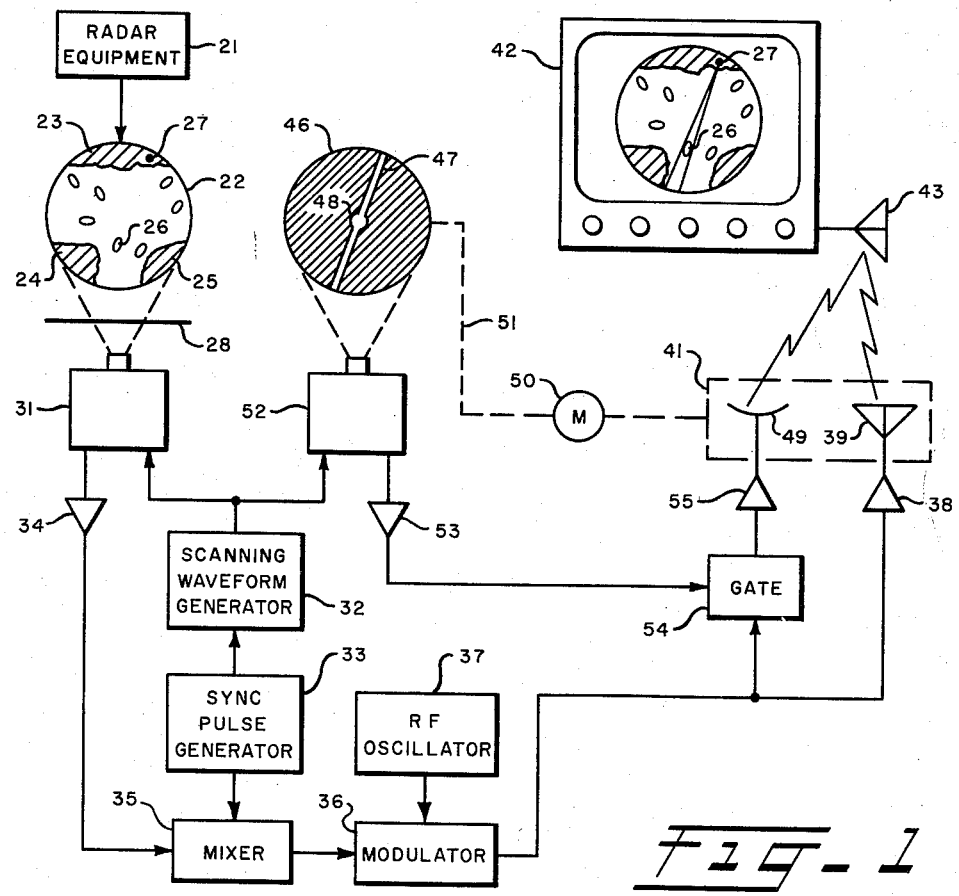
FIG-1
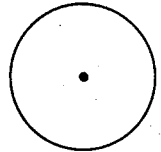  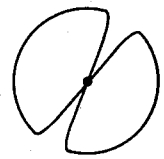
FIG-2  FIG-3  FIG-4
INVENTORS
ALBERT ROBERTS
STANLEY M. SLAWSKY
GUS STAVIS
BY
ATTORNEY.

Feb. 11, 1964 A. ROBERTS ETAL 3,121,223
RADAR AND TELEVISION AID TO NAVIGATION
Filed Oct. 7, 1960 4 Sheets-Sheet 2

*INVENTORS*
ALBERT ROBERTS
STANLEY M. SLAWSKY
GUS STAVIS
BY
*H. S. Mackey*
ATTORNEY.

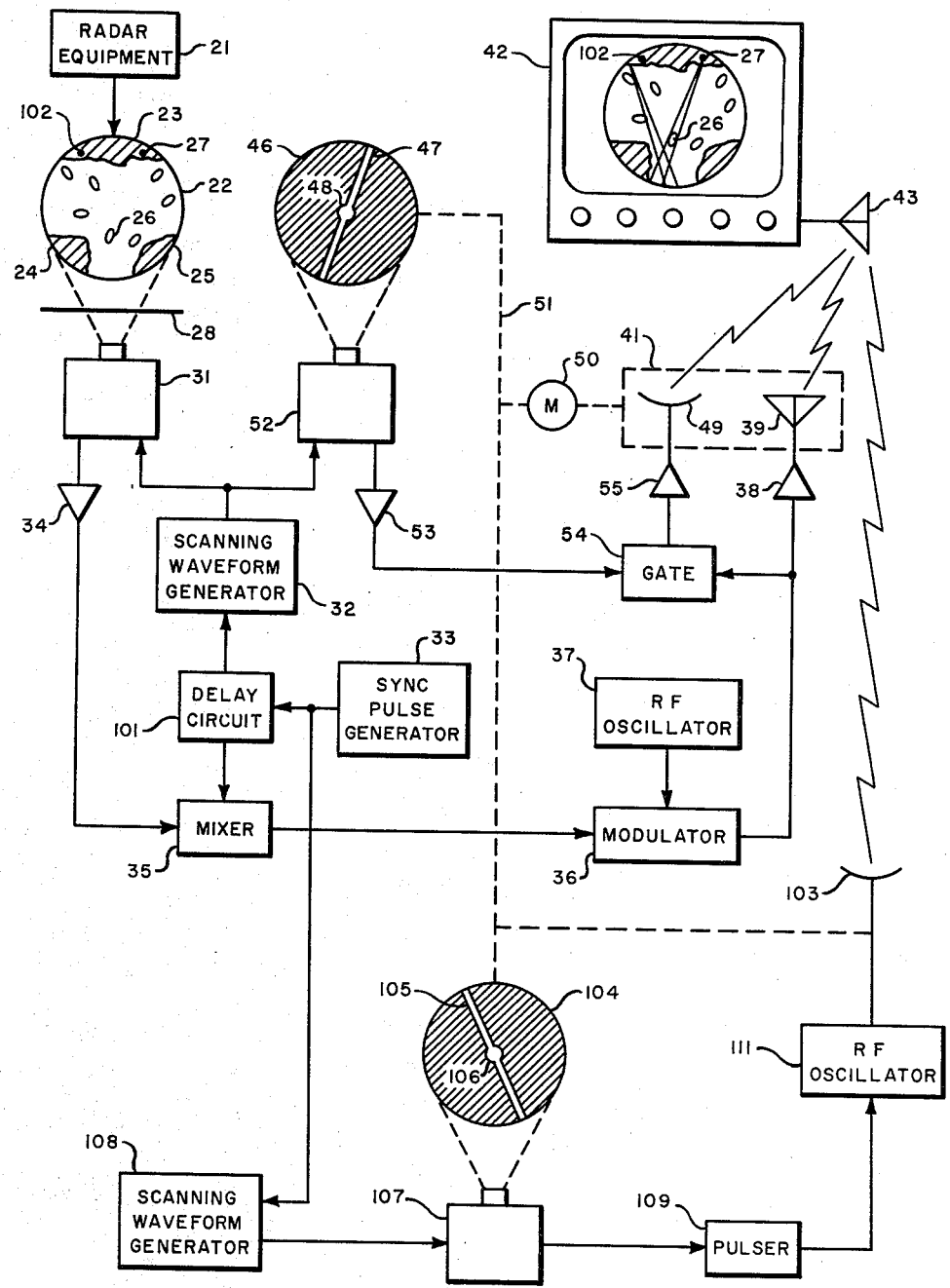

United States Patent Office 3,121,223
Patented Feb. 11, 1964

3,121,223
RADAR AND TELEVISION AID TO NAVIGATION
Albert Roberts, Jamaica, Stanley M. Slawsky, Peekskill, and Gus Stavis, Briarcliff Manor, N.Y., assignors to General Precision, Inc., a corporation of Delaware
Filed Oct. 7, 1960, Ser. No. 61,132
12 Claims. (Cl. 343—6)

This invention relates generally to navigation aiding systems and particularly to a system suitable for aiding the flow of marine traffic in a congested harbor.

The navigation of ships in a busy harbor presents serious problems under conditions of poor visibility. It would obviously be helpful for each vessel to have on board a visual representation of its own position with respect to all other vehicles and fixed surroundings. One way to accomplish this desirable result would be to equip each vessel with self-contained plan position indicating (PPI) radar equipment. While some vessels are at present so equipped, the size and cost of such equipment and the training of operating personnel required precludes its use in many cases.

Many harbors are already equipped with shore based radar equipment and it has been proposed in the past to broadcast by television a representation of the central PPI screen so that any ship, merely by the installation of an inexpensive television receiver, could have the benefit of a view of all of the harbor traffic together with the surrounding land masses, channel markers, and so forth. The difficulty with such arrangements as heretofore proposed has been that no particular ship, seeing all the target blips on its own television screen can ascertain, without additional knowledge, which of the many blips represents its own vessel. A number of partial solutions to this problem have been proposed. For example, a ship can radically alter its course and/or speed and note which target blip exhibits a corresponding change. Such a solution is not entirely satisfactory because of the time required to execute the movement and also because radical course and/or speed changes are not always safe. As another example, it would be possible for the shore based station to be equipped with a computer which determines course and speed of all vessels in which case such data could be printed on the radar display beside each target blip. This arrangement has the disadvantages of high additional cost, cluttering of the screen, and possible ambiguity if more than one vessel has nearly the same course and speed.

It is a general object of the present invention to provide apparatus capable of presenting a visual representation of the objects within a predetermined area to any one wishing to receive the representation.

Another object is to provide apparatus for transmitting a succession of images representing the relative positions of moving and stationary objects in a predetermined area and also transmitting data enabling personnel located at any such object to identify the representation of that object on the transmitted image.

A more specific object is to provide apparatus for broadcasting a television image of a fixed position radar display of a harbor and also transmitting signals enabling any ship within the area of operations to identify its own representation on the image simply by viewing a television screen.

Briefly stated, one embodiment of the invention comprises stationary radar equipment such as a shore based station, for generating a PPI display of the harbor including the marine traffic, channel markers, and surrounding land masses. This PPI display is broadcast to the harbor area by a television transmitter over an omnidirectional antenna. Any ship within the area equipped with a television receiver can therefore view the display. A rotating directional antenna, at the same location as the omnidirectional antenna, emits a narrow rotating beam of energy which cooperates with the energy radiated by the omnidirectional antenna to transmit bearing data, preferably so as to appear on the receiver screen as a line of light representing the instantaneous direction of transmission. Thus, the same shipboard television receiver displays, once each revolution of the rotating beam, a line of light joining the station and the blip representing the ship. Identification may be completed by providing a second directional antenna, installed at a location remote from the first and transmitting additional bearing information.

For a clearer understanding of the invention reference may be made to the following detailed description and the accompanying drawing in which:

FIGURE 1 is a diagram, largely in block form, of one embodiment of the invention;

FIGURES 2, 3 and 4 are diagrams of radiation patterns and are useful in explaining the invention;

FIGURE 8 is a diagram, largely in block form, of yet another embodiment of the invention.

Figure 5:
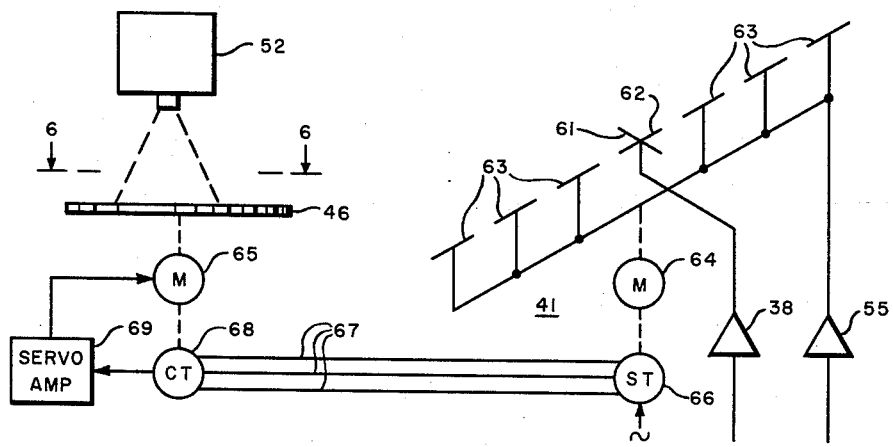
FIGURE 5 is a diagram, largely schematic, of an antenna system and a cursor line generator which may be used in the embodiment of FIGURE 1.

Referring first to FIGURE 1, there is shown schematically suitable shore based radar equipment 21 which generates on a screen 22 a plan position indication (PPI) of the harbor area under surveillance, including land masses 23, 24 and 25, several ships such as the ship 26, and the location 27 of a television transmitting antenna. The location of the radar antenna is immaterial and may or may not be the same as that of the television transmitter.

The screen 22 may be an element of a scan conversion tube, several varieties of which are commercially available, which is designed specifically for the purpose of converting the signals generated by a PPI radar system (based on radial scanning) directly to a standard television signal (based on horizontal scanning). However, at present it is preferred that the screen 22 constitute the face of the usual cathode ray tube and that a television camera 31 be positioned to view the screen 22. This arrangement provides very satisfactory video signals and in addition permits visual enhancement of fixed objects such as channel markers, antenna locations, etc., by placing a transparent mask 28, having opaque marks indicating the location of such objects, between the screen 22 and the camera 31, preferably directly over the screen 22.

The camera 31 is positioned to view the screen 22 so as to generate a video signal representative of the scene displayed by the radar equipment. The camera 31 receives suitable scanning waveforms from a waveform generator 32 which is controlled by a synchronizing pulse generator 33. The video signal from the camera 31 is amplified by an amplifier 34 and led to a mixer 35 where the synchronizing pulses are added. The composite signal from the mixer 35 is led to a modulator 36 where energy from a source of radio frequency such as an oscillator 37 is amplitude modulated by the video signal in accordance with standard television practice. The modulated signal is further amplified by an amplifier 38 and delivered to an omnidirectional transmitting antenna 39, which antenna is part of an antenna system 41.

Also shown in FIGURE 1 is a television receiver 42 located on a ship in the harbor, assumed for illustrative purposes to be on the ship 26. The receiver 42 may be a standard home entertainment receiver, modified or supplemented only to the extent necessary to enable it to receive signals at the frequency of the oscillator 37. The receiver 42 is connected to an omnidirectional receiving antenna 43 to enable signals to be received regardless of the position of the ship in the harbor.

The apparatus so far described operates in a straightforward manner to broadcast an image of the shore based radar PPI display so that personnel on any vessel equipped with a suitable television receiver may view the display. However, shipboard personnel viewing the display cannot ascertain, without cooperative action or additional knowledge, which of the many blips represents one's own vessel. Accordingly the remaining apparatus shown in FIGURE 1 is provided.

There is shown a bearing line, or cursor, generator 46 which is, essentially, a rotating line of light on a dark background. A suitable physical form of the cursor generator 46 will be more fully described but for present purposes it will be sufficient to point out that the line 47 rotates about a point 48 which point represents the location of the television transmitting antenna system 41. The antenna system 41 includes a directional antenna 49, shown schematically in FIGURE 1, a suitable form of which will be more fully described. An electric motor 50 rotates the entire antenna system 41 continuously at a slow speed on the order of from one to twenty revolutions per minute and the cursor line 47 rotates in synchronism therewith, the synchronizing interconnections being shown schematically in FIGURE 1 by the dashed line 51. A second television camera 52 is positioned to view the cursor line generator 46 and generates a video signal representative thereof. The camera 52 is controlled by the scanning waveform generator 32 so that the cameras 31 and 52 scan in synchronism.

Consider the nature of the video signal generated by the camera 52. In accordance with standard practice, the camera 52 scans the image, one horizontal line at a time. Considering one line, as the dark background is scanned no video signal is generated. As the light line 47 is scanned, the video signal increases abruptly and then falls as the line 47 is passed. Thus it is apparent that the video output of the camera 52 is a series of pulses.

The video signal from the camera 52, consisting of a series of pulses, is amplified by an amplifier 53 and led to the control terminal of a gate circuit 54. The input of the gate 54 is connected to the output of the modulator 36 while the output is amplified by an amplifier 55 and then led to the directional antenna 49.

The gate circuit 54 may be a stage of radio frequency amplification the tube of which is normally biased to cut off but rendered conductive for the duration of each video pulse from the camera 52. Although shown separately for clarity, the gate may comprise one of the stages of the amplifier 55. It is noted that the video signal from the camera 52 is not broadcast but is utilized solely to control the time during which the directional antenna 49 is energized by the output of the modulator 36.

The omnidirectional antenna 39, when excited alone, has a substantially uniform radiation pattern in the horizontal plane as shown in FIGURE 2. The directional antenna 49 has a radiation pattern in the horizontal plane comprising two narrow lobes one hundred and eighty degrees apart, as shown in FIGURE 3. The amplitude and phase of the energization of the two antennas is selected so that when both are excited the overall radiation pattern in the horizontal plane is substantially uniform except for two narrow indentations or nulls located diametrically opposite each other, as shown in FIGURE 4. In the direction of the nulls, which correspond to the directions toward which the directional antenna is pointing, the radiation is of very low intensity, approaching zero in the ideal case. The two antennas are preferably designed as a unit and one suitable form will be described subsequently, after the overall operation of the apparatus of FIGURE 1 is considered.

Consider now the image produced by the television receiver 42, assumed to be installed aboard the vessel 26. During the major portion of the revolution of the antenna system 41, while the antenna 49 is not directed toward the vessel 26, the directional antenna 49, whether excited or not, has virtually no effect on the receiver 42. The signal picked up by the antenna 43 is solely that emitted by the omnidirectional antenna 39 and accordingly the PPI presentation appearing on the screen 22 is reproduced by the receiver 42. In order to understand the operation when the antenna 49 is directed toward the ship 26 and the receiver 42, it is convenient to consider the varying situation during each horizontal scan line of the camera 52. When the camera is scanning the dark background of the cursor line generator 46, no video signal is generated, the gate 54 is blocked and the antenna 49 is not energized. Accordingly, the PPI presentation on the screen 22 is traced out on the receiver 42 at this time. When the camera 52 is scanning the bright line 47, a video pulse is generated, the gate 54 is unblocked, the antenna 49 is energized, and the pattern of FIGURE 4 obtains with one of the nulls directed toward the ship 26. Accordingly, the radio frequency signal picked up by the receiving antenna 43 is of very low amplitude which causes a bright spot to appear on the screen of the receiver 42. When the scanning beam of the camera 52 has passed the line 47, the gate 54 is again blocked and the amplitude of the signal received by the antenna 43 is that dictated by the portion of the screen 22 being scanned by the camera 31. In other words, whenever the camera 52 scans the line 47, a bright spot appears on the screen of the receiver 42 while at all other times the scene on the screen 22 is reproduced. Successive scan lines cause successive bright spots which appear on the receiver as a line of light emanating from the point 27 and passing through the vessel 26.

Considering the appearance of the screen of the receiver 42 over a longer period of time, there can at all times be seen the reproduced image of the PPI presentation of the screen 22. During each revolution of the antenna 41 two nulls of radiation are directed toward the receiver and the line 47 crosses the field of view of camera 52 twice. If, for example, the antenna 41 rotates at three revolutions per minute there are six cycles of operation per minute and the line of light appears on the receiver screen every ten seconds, persisting while the antenna 49 is effectively pointing toward the receiver. For a five degree beam width this will be for approximately one quarter of a second. One's own ship can be identified as that ship through which the line of light passes.

Figure 6:
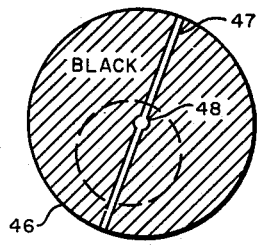
FIGURE 6 is another view of the cursor line generator and is taken on the line 6—6 of FIGURE 5.

FIGURES 5 and 6 illustrate one form of antenna system and cursor line generator which may be used in the present invention. In FIGURE 5 there are shown two crossed dipoles 61 and 62 arranged to form a "turnstile" antenna. These dipoles must be excited in phase quadrature with each other in order to generate a substantially circular radiation pattern but since the techniques for obtaining such excitation are well known, the details have been omitted from FIGURE 5 and the dipoles 61 and 62 are simply shown schematically as being energized by the output of the amplifier 38.

Aligned on either side of the dipole 62 are a plurality of dipoles 63 which constitute the directional antenna 49 of FIGURE 1. All of the dipoles 63 are excited in phase with each other with equal currents, resulting in the production of two narrow broadside beams. To generate broadside nulls, the dipole 62 is excited one hundred and eighty degrees out of phase with the dipoles 63, the current in dipole 62 being N times the current in each of the dipoles 63, where N is the total number of dipoles 63. These relative current magnitudes may be obtained readily by selecting and adjusting the gains of the amplifiers 38 and 55, while the relative phases may be obtained by selecting the lengths of the feeder lines properly, with due regard for the polarity of excitation. The result is the generation of an overall radiation pattern similar to that shown in FIGURE 4. The pattern of FIGURE 4 is idealized, the dipoles 63 actually generating several very low amplitude lobes in direction other than broadside which have the effect of superimposing small undulations on the portion of the curve shown as circular in FIGURE 4. An array comprising thirty-two dipoles 63, sixteen on each side of the dipole 62, provides sufficiently narrow indentations or nulls in the pattern. The entire antenna system including dipoles 61, 62 and 63, is rotated at a substantially constant speed by an electric motor 64.

The cursor line generator 46 may comprise an opaque disc rotated by an electric motor 65 in synchronism with the rotation of the antenna system 41. The synchronizing arrangement is shown as comprising a synchro transmitter 66 mechanically connected to the shaft of the motor 64 and excited by alternating current. A three wire cable 67 connects the stator of the synchro transmitter 66 to the stator of a synchro control transformer 68 mechanically connected to the shaft of the motor 65. The rotor winding of the control transformer 68 controls a servo amplifier 69 which in turn controls the motor 65. It will be understood that the synchronizing arrangement shown is merely illustrative and that other systems, such as a two speed synchro system, could be used.

As best shown in FIGURE 6, the disc 46 is completely painted black except for a thin diametric white line 47. The television camera 52 is mounted to view the disc 46 and its position is adjusted so that the center of rotation 48 corresponds to the representation on the screen 22 (FIGURE 1) of the location 27 of the television transmitter. The field of view is represented in FIGURE 6 by the dashed line enclosing the center 48.

In summary, the apparatus so far described places on the screen of a shipboard television receiver a continuous reproduction of the PPI display of the shore based radar system and additionally displays periodically a line of light emanating from the point 27 and intersecting the blip representing the vessel carrying the television receiver. Accordingly, an operator aboard ship can locate his own ship as lying on the line of light from the point 27. While it is possible for two or more ships to lie on this line, thereby causing an ambiguity, such a condition is in general only temporary and positive identification can be made as soon as one or both vessels move sufficiently so that they no longer lie on the same bearing with respect to the point 27.

Figure 7:
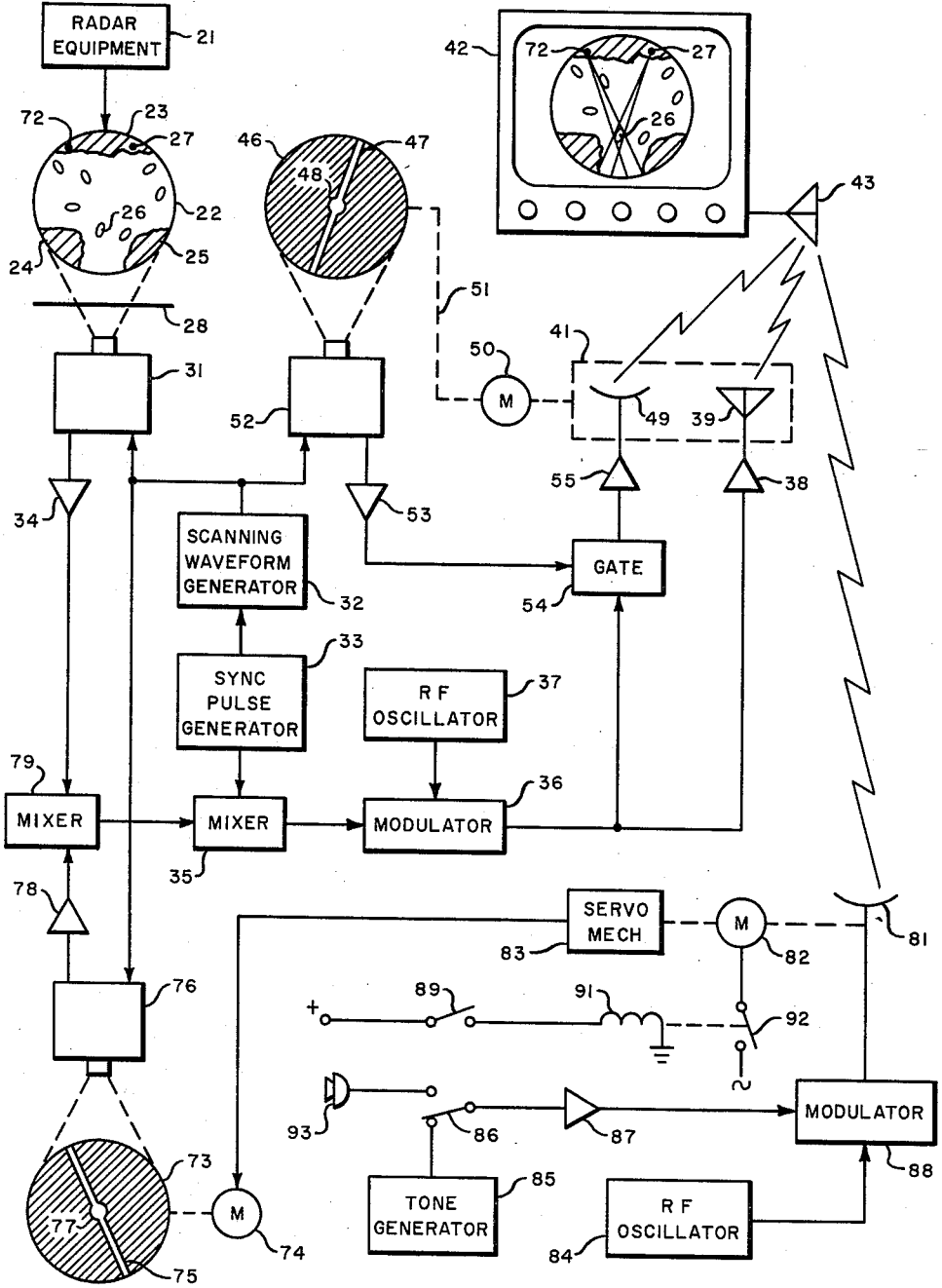
FIGURE 7 is a diagram, largely in block form, of another embodiment of the invention.

A completely unambiguous system, permitting positive identification of one's own ship, can be achieved by the addition of certain apparatus, as shown in FIGURE 7. In this figure, the apparatus of FIGURE 1 is again shown for convenience, and this portion of the system operates as before to place the PPI display and the cursor line on the receiver 42. In addition, a second reference location is established, for example the point 72 shown on the screen 22 and the receiver 42. Apparatus is provided for broadcasting, over the television transmitter previously described and located at point 27, an additional display consisting of a continuously rotating beam of light emanating from the second point 72. Such a display could be generated by a rotating transparent disc overlying the screen 22 and having a white line inscribed thereon but at present the arrangement shown in FIGURE 7 is preferred. A second cursor line generator 73, similar to the generator 46, is rotated by a motor 74 and has inscribed thereon a line 75. A third television camera 76, controlled by the waveform generator 32, views the generator 73 and is positioned so that the center of rotation, the point 77, coincides with the representation of the point 72 on the screen 22. The video signal from the camera 76, after amplification by an amplifier 78, is led to a mixer 79 where the signals from cameras 31 and 76 are combined to form a composite signal which, as before, has synchronizing information added and then is used to modulate the carrier from oscillator 37. The result is that the receiver 42 displays the PPI display continuously and the cursor from point 27 intermittently as before and in addition displays continuously a rotating line of light emanating from the point 72.

At the second reference location, the point 72, there is a transmitter for radiating a signal over the sound channel corresponding to the video channel of the transmitter at point 27. The transmitter includes a directional antenna 81 for radiating a narrow beam the width of which is preferably 5 degrees or less. The antenna 81 may, for example, be a linear array and is rotated at a speed on the order of from one to twenty revolutions per minute by an electric motor 82. A servo mechanism 83, such as a conventional arrangement of synchros, amplifiers, etc., similar to that shown in FIGURE 5, is connected to the motor 74 so that the cursor line generator 73 rotates in synchronism with the antenna 81. The transmitter includes an oscillator 84, which, in accordance with standard practice, operates at a frequency 4.5 mcps above that of the oscillator 37. A tone generator 85, such as a 400 cycle oscillator, generates an audio signal which, after passing through a switch 86 and an amplifier 87, is led to a modulator 88 which frequency modulates the energy from the oscillator 84 in accordance with standard television practice. The motor 82 is energized from a suitable source and may be turned on or off by means of a switch 89 which controls a relay winding 91 the contacts 92 of which are in the energizing circuit of the motor 82.

In operation, the PPI display and the flashing cursor from point 27 appear on the screen of the receiver 42. In addition, a cursor line emanating from the point 72 appears continuously and rotates in synchronism with the rotation of the antenna 81. When the antenna 81 points toward the ship, such as ship 26, aboard which the receiver 42 is installed, the audio signal from the generator 85 can be heard momentarily. This signal indicates to the operator the moment at which the rotating cursor line is intersecting his own ship. Although the audio signal and the flashing cursor do not, in general, appear simultaneously, the operator can readily identify the blip representing his own ship as that blip which lies at the intersection of the flashing cursor from point 27 and the rotating cursor from point 72 at the moment the tone is heard.

The apparatus may also be used to allow an operator on shore to communicate selectively with those vessels located on any straight line through the point 72. The operator, by opening the switch 89, may stop the rotation of the antenna 81 and the cursor line generator 73 at any desired position. He may then operate the switch 86 so as to disconnect the tone generator 85 and substitute therefor a microphone 93. Voice signals may then be transmitted over the narrow beam radiated by the antenna 81 and can be received by any ship lying within this beam.

Another unambiguous system, permitting positive identification of one's own ship, is shown in FIGURE 8. In this figure many of the elements are identical to those of FIGURE 1 and have been denoted by the same reference characters. The upper portion of FIGURE 8 is identical to FIGURE 1 except for two small changes. First, the synchronizing pulse generator 33, instead of being connected directly to the scanning waveform generator 32 and to the mixer 35, is connected to a delay circuit 101 such as an artificial transmission line which in turn is connected to the generator 32 and the mixer 35. Second, there is shown on the radar screen 22 a second point 102. The apparatus in the upper portion of FIGURE 8 operates as previously described in connection with FIGURE 1 to place on the screen of the receiver 42 an image of the radar screen 22 and a periodically flashing cursor line emanating from the point 27 and intersecting the blip 26 representing one's own ship.

At the second location 102 there is installed a directional antenna 103 which may, for example, be a linear array antenna and which is rotated at the same speed and in synchronism with the antenna 49. The synchronizing connections are shown schematically by dotted lines but it will be understood that an appropriate "follow-up" or servo system, similar to that described in connection with FIGURE 5, may be employed.

Also shown in FIGURE 8 is a second cursor line generator 104, similar to the generator 46, in which a white line 105 rotates against a black background about a point 106 which point represents the location 102 of the antenna 103. The generator 104 is rotated in synchronism with the antenna 103, as indicated by the dotted line connection, and the direction of the line 105 represents the direction of the antenna 103. The cursor line generator 104 is viewed by a television camera 107 controlled by a scanning waveform generator 108 which in turn is controlled by pulses from the synchronizing pulse generator 33. The video output of the camera 107 is a series of pulses, one for each horizontal scan line. This video output triggers a pulse generator or pulser 109 which controls the output of an oscillator 111, for example by enabling oscillations to be generated or by unblocking a gate in the output circuit, so that energy is passed to the antenna 103 during and only during each video pulse. The overall result is that the antenna 103 radiates a series of pulses of radio frequency energy, a pulse occurring whenever the line 105 is scanned by the camera 107. The output of oscillator 111 is not otherwise modulated.

The antennas 41 and 103 are necessarily widely separated, perhaps by the order of five or ten miles. Since the intelligence radiated by both antennas is timed and otherwise controlled by the same synchronizing pulse generator 33, a connection such as a land line is required between stations. It would be possible to locate the antenna 103 only at the remote point 102 and to install the oscillator 111, generator 104, camera 107, etc., near the antenna 41, in which case the land line would carry the radio frequency signal from the oscillator 111 to the antenna 103. It would also be possible to install all of the equipment shown at the bottom of FIGURE 8 at the remote point 102, in which case the land line would carry the pulses from the synchronizing pulse generator 33 to the scanning waveform generator 108. Other arrangements of the physical location of the components are also possible. In any event, the land line or other link introduces delay and it is the purpose of the delay circuit 101 to introduce a like delay to the circuits feeding the antenna system 41. The delay introduced by the circuit 101 is matched to that of the land line so that the antenna 103 radiates the signal representing the beginning of the first horizontal line scanned by camera 107 at the same time that the antennas 39 and 49 are radiating the signal representing the beginning of the first horizontal line scanned by the cameras 31 and 52.

The oscillators 37 and 111 operate at nearly but not quite the same frequency. The two frequencies should be close enough to each other so that the receiver 42 may receive signals from either station without retuning yet spaced enough from each other to preclude extended periods of either in phase or out of phase operation. One satisfactory arrangement is to control each oscillator by its own crystal, the two crystals having the same nominal frequency. The inherent frequency difference between two ordinary stock crystals is of the proper magnitude to provide satisfactory operation.

In operation, when neither antenna 49 nor antenna 103 is directed toward the receiver, the PPI image is reproduced by the receiver 42. When the antenna 49 (but not the antenna 103) is directed toward the receiver, the PPI image and the cursor line emanating from the point 27 appear on the receiver screen, as in the case of FIGURE 1. In order to understand the operation when the antenna 103 (but not the antenna 49) is directed toward the receiver, it is helpful to consider the operation during various portions of each horizontal scanning line of the camera 107. When the electron beam of the camera 107 is not traversing the image of the line 105, the antenna 103 does not radiate and so has no effect. The PPI image is reproduced without hindrance. When the electron beam of the camera 107 traverses the image of the line 105, the oscillator 111 is gated on and the antenna 103 radiates radio frequency energy. At the same time the antenna 39 is radiating radio frequency energy the instantaneous amplitude of which may be high or low depending upon the intensity of that portion of the PPI image then being scanned by the camera 31. The electromagnetic field in the vicinity of the antenna 43 will be the resultant of the fields caused by radiation from the antennas 39 and 103 and may be either greater or less than that caused by the antenna 39 alone, depending upon whether the contribution of the antenna 103 is instantaneously in phase or out of phase with that from the antenna 39. If the contributions are in phase the voltage induced in the antenna 43 will be greater, causing the screen to be darkened at that point. If the contributions are out of phase the induced voltage will be less, causing the screen to become brighter. Since the frequencies are different the relative phases change continuously and at some times the phases are such as to cause substantially complete cancellation and a resulting brightening of the screen. Such cancellation will not, in general, occur on each horizontal scan line but will occur at least once every few scan lines. The result is the production of a series of aligned bright spots on the screen of the receiver 42. These spots lie on a straight line representing the angular position of the cursor line 105 and, of course, the orientation of the antenna 103. It is noted that there is no interruption of the reproduction of the PPI image except when the antenna 103 is directed toward the receiver 42 and when the camera 107 is actually scanning the line 105. The location of the line of bright spots on the screen of the receiver 42 depends upon the location of the ship, as explained below.

Figure 9:
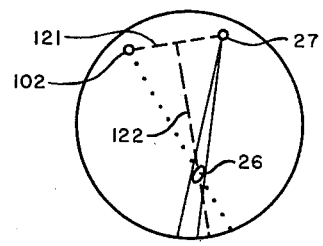
FIGURES 9, 10 and 11 are diagrams useful in explaining the invention.
Figure 10:
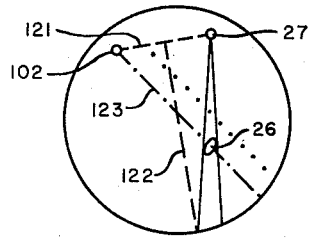
Figure 11:
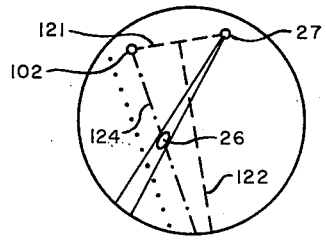

FIGURES 9, 10 and 11 are partial views of the screen of the receiver 42 under various conditions. The majority of the PPI background has been omitted from these figures but in each there are shown the points 27 and 102 representing the location of the antennas 41 and 103 respectively. Additionally, the dashed line 121 is an imaginary line joining the points 27 and 102 while the dashed line 122 is the perpendicular bisector of the line 121 and thus is the locus of points equidistant from the points 27 and 102.

In FIGURE 9, the ship 26 carrying the receiver is assumed to be on the line 122 and there is also shown the cursor emanating from point 27 and passing over the ship 26. It will be recalled that the delay in the land line and the characteristics of the delay circuit 101 are coordinated so that the antenna 39 and the antenna 103 emit that portion of their respective signals corresponding to the beginning of each horizontal scan line at exactly the same time. The scanning circuits of the receiver are controlled by the signal from the antenna 39 and since the receiver is equidistant from the two antennas, signals representing corresponding positions on each scan line arrive at the same time. The result is that the origin 106 (FIGURE 8) of the cursor line 105 is displayed on the receiver superimposed on the point 102. Likewise, each bright spot is generated at the proper position and the line of bright spots, shown as dots in FIGURE 9, emanates from the point 102 and passes through the ship 26.

In FIGURE 10 the ship 26 is assumed to be nearer to the point 27 than to the point 102. Each horizontal scan line of the receiver starts at a time controlled by the signal received from the antenna 39 but the signal corresponding to the beginning of any horizontal line from the antenna 103 does not arrive at the receiver until the line has been partially traced out. The result is that the line of bright spots is displaced to the right and neither emanates from the point 102 nor intersects the ship 26. However, since the delay for all scan lines is the same, the line of spots is displaced in the horizontal direction by the same amount throughout its length. Accordingly, the operator aboard ship can identify his own ship by translating the line of spots parallel to itself until it intersects the point 102 at which time it will also intersect his own ship. The line when so translated is shown as a dot and dash line 123 in FIGURE 10.

In FIGURE 11 the ship 26 is assumed to be nearer to the point 102 than to the point 27. Since portions of the signal from the antenna 103 arrive before corresponding portions from the antenna 39, the line of bright spots is displaced to the left of the point 102 and the ship 26. The operator may translate the line of spots parallel to itself until it passes through the point 102 at which time it will also pass through his own ship 26. Such a translated line is shown as the dot and dash line 124.

In summary, the apparatus of FIGURE 8 displays on the shipboard receiver an image of the PPI presentation of the shore based radar system. A cursor line emanating from the point 27 and intersecting one's own ship flashes on the screen periodically. A line of bright spots also appears periodically. If the line of spots does not emanate from the point 102 the operator translates the line parallel to itself until it intersects the point 102 at which time it will also intersect the blip representing his own ship. Own ship is thus identified as that blip intersected both by the cursor line from point 27 and by the translated line through the point 102.

From the foregoing it is apparent that the present invention enables an operator of a ship in a harbor to receive a visual representation of the harbor and its traffic and to identify the representation of his own ship. The shipboard equipment required is inexpensive, consisting of a standard home entertainment variety of television receiver modified or supplemented only to the extent necessary to enable it to receive signals at the frequency of the shore station. No special training is necessary either to operate the equipment or to interpret the results.

If for any reason the radar equipment is inoperative or unavailable, many of the advantages of the present invention can nevertheless be obtained by substituting for the radar screen 22 a map or chart of the harbor area. Although moving objects are not thereby portrayed, a ship operator can locate himself on the map simply by viewing his television screen. Alternatively, under certain conditions a long range television camera may be used to broadcast a direct television picture of the area.

It is though at present that the invention will have its widest application in connection with marine traffic but it is obvious that the principles involved are also applicable to land or air traffic.

Although certain apparatus has been described in considerable detail for illustrative purposes, many modifications can be made within the spirit of the invention. It is therefore desired that the protection afforded by Letters Patent be limited only by the true scope of the appended claims.

What is claimed is:

1. A navigation aid, comprising, a radar system for generating a first visual representation of an area of operations, an antenna system including a rotating directional antenna and an omnidirectional antenna, television means for radiating over said omnidirectional antenna a signal indicative of said first visual representation, means for generating a second visual representation indicative of the orientation of said directional antenna, a television camera mounted to view said second visual representation, and means including said directional antenna and responsive to the video signal from said camera for substantially nullifying the radiation from said omnidirectional antenna in that direction in which said directional antenna is pointing.

2. A navigation aid, comprising, radar means for generating a first visual representation of an area of operations, an omnidirectional antenna, television means for generating a radio frequency signal indicative of said visual representation and for applying said signal to said omnidirectional antenna, a rotating directional antenna, a gate circuit for controlling the passage of a portion of said radio frequency signal to said directional antenna, means for generating a second visual representation of the orientation of said directional antenna, a television camera positioned to view said second visual representation, and means for controlling said gate circuit in accordance with the video signal from said television camera.

3. A navigation aid, comprising, radar means for generating a visual representation of an area of operations, an omnidirectional antenna, television means for generating a radio frequency signal indicative of said visual representation and for applying said signal to said omnidirectional antenna, a rotating directional antenna, an indicator comprising a line rotating on a background of contrasting brightness for representing continuously the orientation of said directional antenna, a television camera mounted to view said indicator whereby the video output of said camera comprises a series of pulses, a pulse occurring each time said line is scanned by said camera, and means for passing a portion of said signal to said directional antenna only during the occurrence of said pulses.

4. A navigation aid, comprising, radar means for generating a visual representation of an area of operations, an omnidirectional antenna, television means for generating a radio frequency signal indicative of said visual representation and for energizing said omnidirectional antenna with said signal, a rotating directional antenna for radiating electromagnetic energy in phase opposition to the electromagnetic energy radiated by said omnidirectional antenna, an indicator comprising a white line rotating on a black background for representing continuously the orientation of said directional antenna, a television camera mounted to view said indicator whereby the video output of said camera comprises a series of pulses, one pulse occurring each time said line is scanned by said camera, means for passing a portion of said signal to said directional antenna only during the occurrence of said pulses, and means for equalizing the magnitude of the fields radiated by said antennas in the direction of maximum field intensity of said directional antenna.

5. A navigation aid, comprising, radar means for generating a first visual representation of an area of operations, means including a first television camera and a radio frequency oscillator for generating a modulated radio frequency signal indicative of said first visual representation, means including an omnidirectional antenna for broadcasting said signal throughout said area, a continuously rotating directional antenna, means for generating a second visual representation of the direction of radiation of said directional antenna, a second television camera positioned to view said second visual representation, a gate circuit for controlling the passage of a portion of said signal to said directional antenna, means for feeding said directional antenna to radiate energy in phase opposition to the radiation from said omnidirectional antenna, and means for controlling said gate circuit in accordance with the video signal from said second television camera.

6. A navigation aid, comprising, radar equipment including a screen for displaying an image of an area of operations, an antenna system including a directional antenna for radiating a narrow beam of energy and also including an omnidirectional antenna, said antennas being positioned closely enough to each other so that at any point within the area of operations the radiation from said antennas may be regarded as emanating from the same point, motive means for rotating said directional antenna continuously, a first television camera positioned to view said screen, an indicator rotated in synchronism with said directional antenna for indicating the direction of radiation of said directional antenna, a second television camera positioned to view said indicator, a synchronizing pulse generator, means including said pulse generator for synchronizing the scanning operation of said first and second cameras, a radio frequency oscillator, means for modulating the energy from said oscillator both with pulses from said pulse generator and with the video output from said first camera whereby a radio frequency television signal indicative of the image on said screen is produced, a first transmission path for energizing said omnidirectional antenna in accordance with said signal, a second transmission path for energizing said directional antenna in accordance with said signal, means for feeding said antennas to radiate energy in phase opposition to each other, a gate circuit interposed in said second transmission path for controlling the time intervals during which said directional antenna is energized, and means for controlling said gate circuit in accordance with the video output of said second camera.

7. A navigation aid, comprising, a permanently located radar system for generating a first visual representation of an area of operations, a mobile television receiver within said area of operations, a permanently located antenna system including a rotating directional antenna and an omnidirectional antenna, television means for radiating over said omnidirectional antenna a signal indicative of said first visual representation, whereby an image of said first visual representation is produced by said television receiver, means for generating a second visual representation indicative of the orientation of said directional antenna, a television camera mounted to view said second visual representation, and means including said directional antenna and responsive to the video signal from said camera for substantially nullifying the radiation from said omnidirectional antenna in that direction in which said directional antenna is pointing, whereby there appears periodically on said receiver a line of light appearing to emanate from the location of said directional antenna and intersecting the location of said receiver.

8. A navigation aid, comprising, fixed position radar equipment for generating a first visual representation of an area of operations, a mobile television receiver, means including a first television camera and a radio frequency oscillator for generating a modulated radio frequency signal indicative of said first visual representation, means including a fixed position omnidirectional antenna for broadcasting said signal throughout said area, whereby said receiver reproduces said first visual representation, a continuously rotating directional antenna, means for generating a second visual representation of the direction of radiation of said directional antenna, a second television camera positioned to view said second visual representation, a gate circuit for controlling the passage of a portion of said signal to said directional antenna, means for feeding said directional antenna to radiate energy in phase opposition to the radiation from said omnidirectional antenna, and means for controlling said gate circuit in accordance with the video signal from said second television camera, whereby there is produced intermittently at said receiver an image of a line of light emanating from the location of said antennas and intersecting the location of said receiver.

9. A navigation aid, comprising, radar means for generating a first visual representation of an area of operations, an omnidirectional antenna at a first location, a first rotating directional antenna at said first location, said first directional antenna being arranged to radiate energy out of phase with the radiation of said omnidirectional antenna, means for generating a second visual representation of the orientation of said first directional antenna, a second rotating directional antenna at a second location, means for energizing said second directional antenna with radio frequency energy modulated by an audio frequency, means for generating a third visual representation of the orientation of said second directional antenna, means including said omnidirectional antenna for broadcasting a signal indicative of said first and third visual representations, a gate circuit for controlling the passage of a portion of said signal to said first directional antenna, a television camera positioned to view said second visual representation, and means for controlling said gate circuit in accordance with the video output of said television camera.

10. A navigation aid, comprising, radar equipment for generating a first visual representation of an area of operations, an antenna system installed at a first location, said antenna system including an omnidirectional antenna and a first rotating directional antenna, a first television camera positioned to view said first visual representation, means for generating a second visual representation of the orientation of said first directional antenna, a second television camera mounted to view said second visual representation, a second rotating directional antenna installed at a second location remote from said first location, means for generating a third visual representation of the orientation of said second directional antenna, a third television camera positioned to view said third visual representation, means for combining the video signal outputs of said first and third television camera to form a composite video signal, a first radio frequency oscillator operating at the frequency of the picture carrier of a predetermined television channel, means for amplitude modulating the energy from said first oscillator in accordance with said composite video signal to form a radio frequency signal, means for energizing said omnidirectional antenna from said radio frequency signal, a gate circuit for controlling the passage of a portion of said radio frequency signal to said first directional antenna, means for feeding said first directional antenna to radiate energy in phase opposition to the radiation from said omnidirectional antenna, means for controlling said gate circuit in accordance with the video signal from said second television camera, a second radio frequency oscillator operating at the frequency of the sound carrier of said predetermined television channel, means for frequency modulating the energy from said second oscillator with an audio frequency signal, and means for energizing said second directional antenna with the modulated energy from said second oscillator.

11. A navigation aid, comprising, radar equipment for generating a first visual representation of an area of operations, an omnidirectional antenna at a first location, means for energizing said omnidirectional antenna with a radio frequency signal modulated in accordance with said first visual representation, a first rotating directional antenna at said first location, said first directional antenna being arranged to radiate energy out of phase with the radiation from said omnidirectional antenna, a gate circuit for controlling the passage of a portion of said signal to said first directional antenna, means for generating a second visual representation of the orientation of said first directional antenna, a first television camera mounted to view said second visual representation, means for controlling said gate circuit in accordance with the video output of said first television camera, a second directional antenna at a second location rotating in synchronism with the rotation of said first directional antenna, means for generating a third visual representation of the orientation of said second directional antenna, a second television camera mounted to view said third visual representation, a radio frequency oscillator for energizing said second directional antenna, a pulse generating circuit for controlling said oscillator to operate only during the application of pulses, thereto, and means for controlling said pulse generating circuit in accordance with the video output of said second television camera.

12. An aid to navigation, comprising, radar equipment for generating a first visual representation of an area of operations, a first television camera mounted to view said first visual representation, a first radio frequency oscillator, a modulator for amplitude modulating energy from said first oscillator in accordance with the video output of said first television camera, an omnidirectional antenna at a first location, means for energizing said omnidirectional antenna with a signal derived from the output of said modulator, a first rotating directional antenna at said first location, said first directional antenna being arranged to radiate energy out of phase with the radiation from said omnidirectional antenna, a gate circuit for controlling the passage of a portion of said signal to said first directional antenna, means for generating a second visual representation of the orientation of said first directional antenna, a second television camera mounted to view said second visual representation, means for controlling said gate circuit in accordance with the video output of said second television camera, a second directional antenna at a second location rotating in synchronism with the rotation of said first directional antenna, means for generating a third visual representation of the orientation of said second directional antenna, a third television camera mounted to view said third visual representation, a second radio frequency oscillator operating at substantially the same frequency as but asynchronously with said first oscillator, means for energizing said second directional antenna from the output of said second oscillator, a pulse generating circuit for controlling said second oscillator to operate only during the application of pulses thereto, and means for controlling said pulse generating circuit in accordance with the video output of said third television camera.

References Cited in the file of this patent
UNITED STATES PATENTS

| | | |
|---|---|---|
| 2,632,157 | Jones | Mar. 17, 1953 |
| 2,922,154 | Granqvist | Jan. 19, 1960 |

FOREIGN PATENTS

| | | |
|---|---|---|
| 823,406 | Great Britain | Nov. 11, 1959 |